Patented Jan. 30, 1951

2,539,586

UNITED STATES PATENT OFFICE 2,539,586

PREPARATION OF CELLULOSE ESTERS

Mervin E. Martin, Troy M. Andrews, and Albert R. Franck, Cumberland, Md., assignors to Celanese Corporation of America, New York, N. Y., a corporation of Delaware No Drawing. Application August 20, 1949,
Serial No. 111,586

8 Claims. (Cl. 260—230)

This invention relates to the preparation of cellulose esters and relates more particularly to an improved process for ripening organic acid esters of cellulose.

In the preparation of organic acid esters of cellulose, cellulosic material is usually esterified by treatment with an organic acid anhydride in the presence of sulfuric acid and an organic acid solvent for the ester being formed. The esterified cellulose is obtained in the form of a viscous solution, to which water is added in an amount sufficient to convert any remaining organic acid anhydride into the corresponding organic acid. The cellulose ester, usually after the addition of a further quantity of water to the solution, is permitted to hydrolyze or ripen to develop the desired characteristics. Water or other non-solvent for the cellulose ester is then added to the solution in sufficient amounts to precipitate the cellulose ester, following which the cellulose ester is washed to free it from acids, stabilized if necessary, washed again and finally dried.

During the hydrolysis or ripening of the organic acid ester of cellulose in accordance with the above process there is split off from the ester a portion of the acyl groups and all or a portion of the combined sulfuric acid. In addition, the cellulose molecule is degraded to a considerable extent causing a reduction in the viscosity of the cellulose ester and of solutions containing the same. To compensate for the loss in the viscosity of the cellulose ester during ripening, it has heretofore been customary to carry on the esterification in such fashion that the viscosity of the cellulose ester before ripening is considerably higher than required in the final product. While this enables a final product of the desired viscosity to be obtained, it produces an extremely viscous solution at the end of the esterification. The high viscosity of this solution makes it difficult to transfer the same from the esterification to the ripening vessels. In addition, the esterification solution is thixotropic so that the viscosity of any portion thereof that remains for a period of time in the esterification vessels or in the conduits employed for the transfer of the solution from the esterification to the ripening vessels will increase by several hundred percent. As a result, excessive pressures will be required to move this material through and from the conduits. These difficulties are particularly pronounced when it is desired to prepare a high viscosity cellulose ester, since in such case the viscosity of the esterification solution may rise to from 2,000,000 to 5,000,000 centipoises.

It is an important object of this invention to provide a process for ripening organic acid esters of cellulose which will be free from the foregoing and other disadvantages of the prior processes employed for this purpose and which will be especially simple and efficient in operation.

A further object of this invention is to provide a process for ripening organic acid esters of cellulose in which the cellulose esters will suffer no appreciable loss in viscosity.

Other objects of this invention will be apparent from the following detailed description and claims.

In accordance with this invention, a cellulosic material is esterified by treatment with an organic acid anhydride in the presence of sulfuric acid and an organic acid solvent for the ester being formed. During this esterification, the concentration of sulfuric acid preferably ranges from 12.8 to 20% on the weight of the cellulosic material although larger or smaller concentrations of sulfuric acid may also be employed.

Following the completion of the esterification, a sufficient quantity of water is added to the esterification solution to convert any excess organic acid anhydride to the corresponding organic acid and to produce a concentration of water of from 20 to 60% on the weight of the cellulosic material. The concentration of free sulfuric acid is also adjusted to from 1.5 to 2.5% or, preferably, from 1.65 to 1.95% on the weight of the cellulosic material, either by adding an alkaline material to the esterification solution, or, when the esterification solution has previously been neutralized to stabilize the same for storage, by adding sulfuric acid thereto. The water and alkaline material or sulfuric acid are preferably added as a dilute aqueous acetic acid solution to prevent the premature precipitation of the cellulose ester. The esterification solution which is at a temperature of from 32 to 35° C. is then heated to a temperature of from 55 to 60° C. in a period of 20 to 30 minutes, preferably by the injection of steam or steam and water and is held within said temperature range for from 20 to 40 minutes. It is important, during this first stage of the ripening to maintain the concentration of sulfuric acid, the temperature and the time of treatment within the limits set forth above. If any of the upper limits are exceeded a degradation of the cellulose molecule will take place. On the other hand, if the conditions fall below the lower limits, the cellulose ester will not be ripened properly.

Following the first stage of the ripening, the concentration of free sulfuric acid in the solution, containing the now partially ripened cellulose ester, is reduced to from 0.7 to 0.9% by the addition thereto of an alkaline material. In addition, a further quantity of water, preferably in the form of a dilute aqueous acetic acid solution, is added to the cellulose ester solution in an amount of from 50 to 125% by weight on the weight of the cellulosic material. The addition of water may advantageously take place simultaneously with the further heating of the cellulose ester solution, preferably by the injection of steam or steam and water, to a temperature of from 82 to 87° C. The cellulose ester solution is held at this temperature until its acyl content has been reduced to the desired value, which normally takes place in from 350 to 400 minutes, total ripening time. The cellulose ester may then be precipitated from solution, washed to remove free acid therefrom, stabilized if necessary, washed again and finally dried, all as well known in the art.

Among the alkaline materials that may be employed to control the concentration of free sulfuric acid are, for example, magnesium acetate, calcium acetate, magnesium carbonate, calcium carbonate, zinc oxide, zinc acetate or mixtures thereof.

We have found that the ripening of organic acid esters of cellulose in accordance with this process produces substantially no loss in the viscosity of the cellulose esters. This is of particular importance in the preparation of cellulose esters of high viscosity, namely those having a viscosity in excess of 100 units, these units as employed herein being a measure of the rate of flow of a 6% solution of the ester in acetone, taking the rate of flow of glycerine as 100, since, by employing our process, it is no longer necessary to carry on the esterification to produce an ester having a viscosity considerably higher than required in the final product, which results in the production of extremely viscous esterification solutions. We have also found that our process is effective, not only to split off a portion of the acyl groups from the cellulose esters, but also to split off substantially all of the combined sulfuric acid. It is, therefore, unnecessary, in most cases, to stabilize the cellulose esters following their ripening.

Our process may be employed for the production of cellulose acetate, which is commercially the most important organic acid ester of cellulose at the present time. It may also be employed for the production of other simple and mixed organic acid esters of cellulose including, for example, cellulose propionate, cellulose butyrate, cellulose acetate propionate and cellulose acetate butyrate.

The following example is given to illustrate our invention further.

*Example*

An acetylation mixture comprising 107.5 parts by weight of acetic acid, 75 parts by weight of acetic anhydride and 3.58 parts by weight of sulfuric acid are mixed with 28 parts by weight of cotton linters to acetylate the same. There is then stirred into the acetylation solution sufficient water to destroy the excess acetic anhydride and in addition an amount equal to 38% by weight on the weight of the cotton linters, together with sufficient magnesium acetate to reduce the concentration of free sulfuric acid to 1.5% by weight on the weight of the cotton linters. The temperature of the solution is raised to 60° C. by the injection of steam and is held at said temperature for 30 minutes. At this point an additional quantity of water in an amount equal to 57% by weight on the weight of the cellulosic material is added to the solution together with sufficient magnesium acetate to reduce the concentration of free sulfuric acid to 0.85%. The acetylation solution is heated to a temperature of 85° C. by the injection of steam and held at said temperature for 270 minutes. At the end of this period there is obtained a cellulose acetate having a viscosity of 106 as measured in the units hereinbefore defined.

It is to be understood that the foregoing detailed description is given merely by way of illustration and that many variations may be made therein without departing from the spirit of our invention.

Having described our invention, what we desire to secure by Letters Patent is:

1. In a process for ripening organic acid esters of cellulose prepared by the esterification of a cellulosic material with an organic acid anhydride in the presence of sulfuric acid and an organic acid solvent for the ester being formed, the steps which comprise adjusting the concentration of free sulfuric acid in the esterification solution to from 1.5 to 2.5% by weight on the weight of the cellulosic material, raising the temperature of the esterification solution to from 55 to 60° C. for a period of from 20 to 40 minutes, adjusting the concentration of free sulfuric acid in the esterification solution to from 0.7 to 0.9% by weight on the weight of the cellulosic material, raising the temperature of the esterification solution to from 82 to 87° C., and holding the esterification solution at from 82 to 87° C. until the organic acid ester of cellulose has the desired acyl value.

2. In a process for ripening organic acid esters of cellulose prepared by the esterification of a cellulosic material with an organic acid anhydride in the presence of sulfuric acid and an organic acid solvent for the ester being formed, the steps which comprise adjusting the concentration of free sulfuric acid in the esterification solution to from 1.65 to 1.95% by weight on the weight of the cellulosic material, raising the temperature of the esterification solution from 32 to 35° C. to 55 to 60° C. in a period of from 20 to 30 minutes, holding the esterification solution at a temperature of from 55 to 60° C. for a period of from 20 to 40 minutes, adjusting the concentration of free sulfuric acid in the esterification solution to from 0.7 to 0.9% by weight on the weight of the cellulosic material, raising the temperature of the esterification solution to from 82 to 87° C. and holding the esterification solution at from 82 to 87° C. until the organic acid ester of cellulose has the desired acyl value.

3. In a process for ripening organic acid esters of cellulose prepared by the esterification of a cellulosic material with an organic acid anhydride in the presence of sulfuric acid and an organic acid solvent for the ester being formed, the steps which comprise adjusting the concentration of free sulfuric acid in the esterification solution to from 1.5 to 2.5% by weight on the weight of the cellulosic material, adding water to the esterification solution in an amount of from 20 to 60% by weight on the weight of the cellulosic material, raising the temperature of the esterification solution to from 55 to 60° C. for a period of from 20 to 40 minutes, adjusting the concentration of free sulfuric acid in the esterification solution to from 0.7 to 0.9% by weight on the weight of the cellulosic material, raising the temperature of the esterification solution to from 82 to 87° C., and holding the esterification solution at from 82 to 87° C. until the organic acid ester of cellulose has the desired acyl value.

4. In a process for ripening organic acid esters of cellulose prepared by the esterification of a cellulosic material with an organic acid anhydride in the presence of sulfuric acid and an organic acid solvent for the ester being formed, the steps which comprise adjusting the concentration of free sulfuric acid in the esterification solution to from 1.65 to 1.95% by weight on the weight of the cellulosic material, adding water to the esterification solution in an amount of from 20 to 60% by weight on the weight of the cellulosic material, raising the temperature of the esterification solution to from 55 to 60° C. for a period of from 20 to 40 minutes, adjusting the concentration of free sulfuric acid in the esterification solution to from 0.7 to 0.9% by weight on the weight of the cellulosic material, adding water to the esterification solution in an amount of from 50 to 125% by weight on the weight of the cellulosic material, raising the temperature of the esterification solution to from 82 to 87° C., and holding the esterification solution at from 82 to 87° C. until the organic acid ester of cellulose has the desired acyl value.

5. In a process for ripening cellulose acetate prepared by the acetylation of a cellulosic material with acetic anhydride in the presence of sulfuric acid and acetic acid, the steps which comprise adjusting the weight of free sulfuric acid in the acetylation solution to from 1.65 to 1.95% by weight on the weight of the cellulosic material, raising the temperature of the acetylation solution from 32 to 35° C. to 55 to 60° C. in a period of from 20 to 30 minutes, holding the esterification solution at a temperature of from 55 to 60° C. for a period of from 20 to 40 minutes, adjusting the concentration of free sulfuric acid in the acetylation solution to from 0.7 to 0.9% by weight on the weight of the cellulosic material, raising the temperature of the acetylation solution to from 82 to 87° C., and holding the acetylation solution at from 82 to 87° C., until the cellulose acetate has the desired acetyl value.

6. In a process for ripening cellulose acetate prepared by the acetylation of a cellulosic material with acetic anhydride in the presence of sulfuric acid and acetic acid, the steps which comprise adjusting the weight of free sulfuric acid in the acetylation solution to from 1.5 to 2.5% by weight on the weight of the cellulosic material, adding water to the acetylation solution in an amount of 20 to 60% by weight on the weight of the cellulosic material, raising the temperature of the acetylation solution to from 55 to 60° C. for a period of from 20 to 40 minutes, adjusting the concentration of free sulfuric acid in the acetylation solution to from 0.7 to 0.9% by weight on the weight of the cellulosic material, adding water to the acetylation solution in an amount of from 50 to 125% by weight on the weight of the cellulosic material, raising the temperature of the acetylation solution to from 82 to 87° C., and holding the acetylation solution at from 82 to 87° C. until the cellulose acetate has the desired acetyl value.

7. In a process for ripening cellulose acetate prepared by the acetylation of a cellulosic material with acetic anhydride in the presence of sulfuric acid and acetic acid, the steps which comprise adjusting the weight of free sulfuric acid in the acetylation solution to from 1.65 to 1.95% by weight on the weight of the cellulosic material, adding water to the acetylation solution in an amount of 20 to 60% by weight on the weight of the cellulosic material, raising the temperature of the acetylation solution to from 55 to 60° C. for a period of from 20 to 40 minutes, adjusting the concentration of free sulfuric acid in the acetylation solution to from 0.7 to 0.9% by weight on the weight of the cellulosic material, adding water to the acetylation solution in an amount of from 50 to 125% by weight on the weight of the cellulosic material, raising the temperature of the acetylation solution to from 82 to 87° C. and holding the acetylation solution at from 82 to 87° C. until the cellulose acetate has the desired acetyl value.

8. In a process for ripening cellulose acetate prepared by the acetylation of a cellulosic material with acetic anhydride in the presence of sulfuric acid and acetic acid, to produce a cellulose acetate having a viscosity in excess of 100 units, the steps which comprise adjusting the weight of the free sulfuric acid in the acetylation solution to from 1.5 to 2.5% by weight on the weight of the cellulosic material, raising the temperature of the acetylation solution to from 55 to 60° C. for a period of from 20 to 40 minutes, adjusting the concentration of free sulfuric acid in the acetylation solution to from 0.7 to 0.9% by weight on the weight of the cellulosic material, raising the temperature of the acetylation solution at from 82 to 87° C., and holding the acetylation solution at from 82 to 87° C. until the cellulose acetate has the desired acetyl value.

MERVIN E. MARTIN.
TROY M. ANDREWS.
ALBERT R. FRANCK.

REFERENCES CITED

The following references are of record in the file of this patent:

UNITED STATES PATENTS

| Number | Name | Date |
| --- | --- | --- |
| 2,101,984 | Conklin | Dec. 14, 1937 |
| 2,259,462 | Fletcher | Oct. 21, 1941 |
| 2,285,536 | Seymour et al. | June 9, 1942 |